United States Patent
Ku et al.

(10) Patent No.: US 11,946,802 B2
(45) Date of Patent: Apr. 2, 2024

(54) AMBIENT LIGHT SENSOR

(71) Applicant: VisEra Technologies Company Limited, Hsin-Chu (TW)

(72) Inventors: Shih-Liang Ku, Hsin-Chu (TW); Zi-Han Liao, Hsin-Chu (TW); Chun-Wei Huang, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 18/192,416

(22) Filed: Mar. 29, 2023

(65) Prior Publication Data

US 2024/0053195 A1 Feb. 15, 2024

Related U.S. Application Data

(60) Provisional application No. 63/397,052, filed on Aug. 11, 2022.

(51) Int. Cl.
*G01J 1/42* (2006.01)
*G01J 1/04* (2006.01)

(52) U.S. Cl.
CPC ........... *G01J 1/4204* (2013.01); *G01J 1/0474* (2013.01)

(58) Field of Classification Search
CPC .......... G01J 1/04; G01J 1/0407; G01J 1/0474; G01J 1/42; G01J 1/4204
See application file for complete search history.

(56) References Cited

U.S. PATENT DOCUMENTS

| | | | | |
|---|---|---|---|---|
| 10,259,704 B2 * | 4/2019 | Cho | | B82B 3/0014 |
| 10,508,981 B2 * | 12/2019 | Ndukaife | | G21K 1/006 |
| 11,112,642 B2 * | 9/2021 | Williams | | G02B 5/288 |
| 11,177,303 B2 * | 11/2021 | Yang | | H01L 27/14627 |
| 11,487,139 B2 * | 11/2022 | Roy | | B82Y 20/00 |
| 11,543,653 B2 * | 1/2023 | Fan | | G02B 1/002 |
| 11,681,077 B2 * | 6/2023 | Bartlett | | G02B 5/32 |
| | | | | 345/694 |
| 2018/0224574 A1 * | 8/2018 | Lee | | C23C 14/0617 |
| 2019/0064532 A1 * | 2/2019 | Riley, Jr | | G02B 6/428 |
| 2020/0386911 A1 * | 12/2020 | Doshay | | G02B 1/002 |
| 2021/0361233 A1 * | 11/2021 | Wilson | | H05K 5/03 |
| 2022/0137402 A1 * | 5/2022 | Park | | G02B 26/127 |
| | | | | 359/197.1 |
| 2022/0156479 A1 * | 5/2022 | Wang | | G01J 3/51 |
| 2022/0178748 A1 * | 6/2022 | Cui | | G02B 1/002 |
| 2022/0382120 A1 * | 12/2022 | Li | | H01L 31/02162 |
| 2023/0012003 A1 * | 1/2023 | Ma | | H01L 27/14627 |
| 2023/0105985 A1 * | 4/2023 | Teng | | G02F 1/292 |
| | | | | 359/318 |
| 2023/0118541 A1 * | 4/2023 | Quaade | | B29C 59/026 |
| | | | | 264/447 |
| 2023/0186870 A1 * | 6/2023 | Cristache | | G06N 5/025 |
| | | | | 345/204 |

(Continued)

*Primary Examiner* — John R Lee
(74) *Attorney, Agent, or Firm* — MUNCY, GEISSLER, OLDS & LOWE, P.C.

(57) ABSTRACT

An ambient light sensor includes a substrate, a metasurface disposed on the substrate, and an aperture layer disposed on the substrate. The metasurface includes a plurality of nanostructures and a filling layer laterally surrounding the plurality of nanostructures. The aperture layer laterally separates the metasurface into a plurality of sub-meta groups.

19 Claims, 12 Drawing Sheets

(56) References Cited

U.S. PATENT DOCUMENTS

| | | | |
|---|---|---|---|
| 2023/0194757 A1* | 6/2023 | Hansen | G02B 5/1819 359/245 |
| 2023/0221416 A1* | 7/2023 | Park | G01S 7/4817 356/4.01 |
| 2023/0247913 A1* | 8/2023 | Nishio | H10N 50/10 257/427 |
| 2023/0266167 A1* | 8/2023 | Houck | G01J 1/029 356/300 |

* cited by examiner

AMBIENT LIGHT SENSOR

CROSS REFERENCE TO RELATED APPLICATIONS

This application claims priority of provisional application of U.S. Patent Application No. 63/397,052 filed on Aug. 11, 2022, the entirety of which is incorporated by reference herein.

BACKGROUND

Technical Field

The present disclosure relates to an ambient light sensor (ALS), and in particular it relates to the metasurface of an ambient light sensor.

Description of the Related Art

Electronic devices such as laptop computers, cellular telephones, and other equipment are sometimes provided with light sensors. For example, ambient light sensors may be incorporated into a device to provide the necessary information on surrounding lighting conditions. The optical readings of the ambient light sensors may be used to control the device settings. For example, if bright daylight conditions are detected, the electronic device may increase the display brightness for compensation. In some configurations, the ambient light sensors are implemented to gather information on the colors of the ambient light (such as the spectrum). The colors of a displayed image can be adjusted based on the colors of the ambient light.

In order to gather optical readings on different colors, the ambient light sensors may include multi-spectral bandpass filters. Each of the multi-spectral bandpass filters may allow a specific wavelength (or color) of the ambient light to transmit, while other unwanted colors (including infrared from sunlight) are either absorbed or reflected away by the multi-spectral bandpass filters, thereby elevating the color distinguish ability. Since the multi-spectral bandpass filters are different from each other, they have to be patterned separately. Depending on the amount of multi-spectral bandpass filters designed, there can be plenty of patterning process cycles, which leads to a longer cycle time and higher manufacturing costs. Therefore, these and related issues need to be addressed through the design and manufacture of the ambient light sensor.

SUMMARY

In an embodiment, an ambient light sensor includes a substrate, a metasurface disposed on the substrate, and an aperture layer disposed on the substrate. The metasurface includes a plurality of nanostructures, and a filling layer laterally surrounding the plurality of nanostructures. The aperture layer laterally separates the metasurface into a plurality of sub-meta groups.

BRIEF DESCRIPTION OF THE DRAWINGS

The disclosure can be more fully understood from the following detailed description when read with the accompanying figures. It is worth noting that, in accordance with standard practice in the industry, various features are not drawn to scale. In fact, the dimensions of the various features may be arbitrarily increased or reduced for clarity of discussion.

DETAILED DESCRIPTION

Figure 1A:
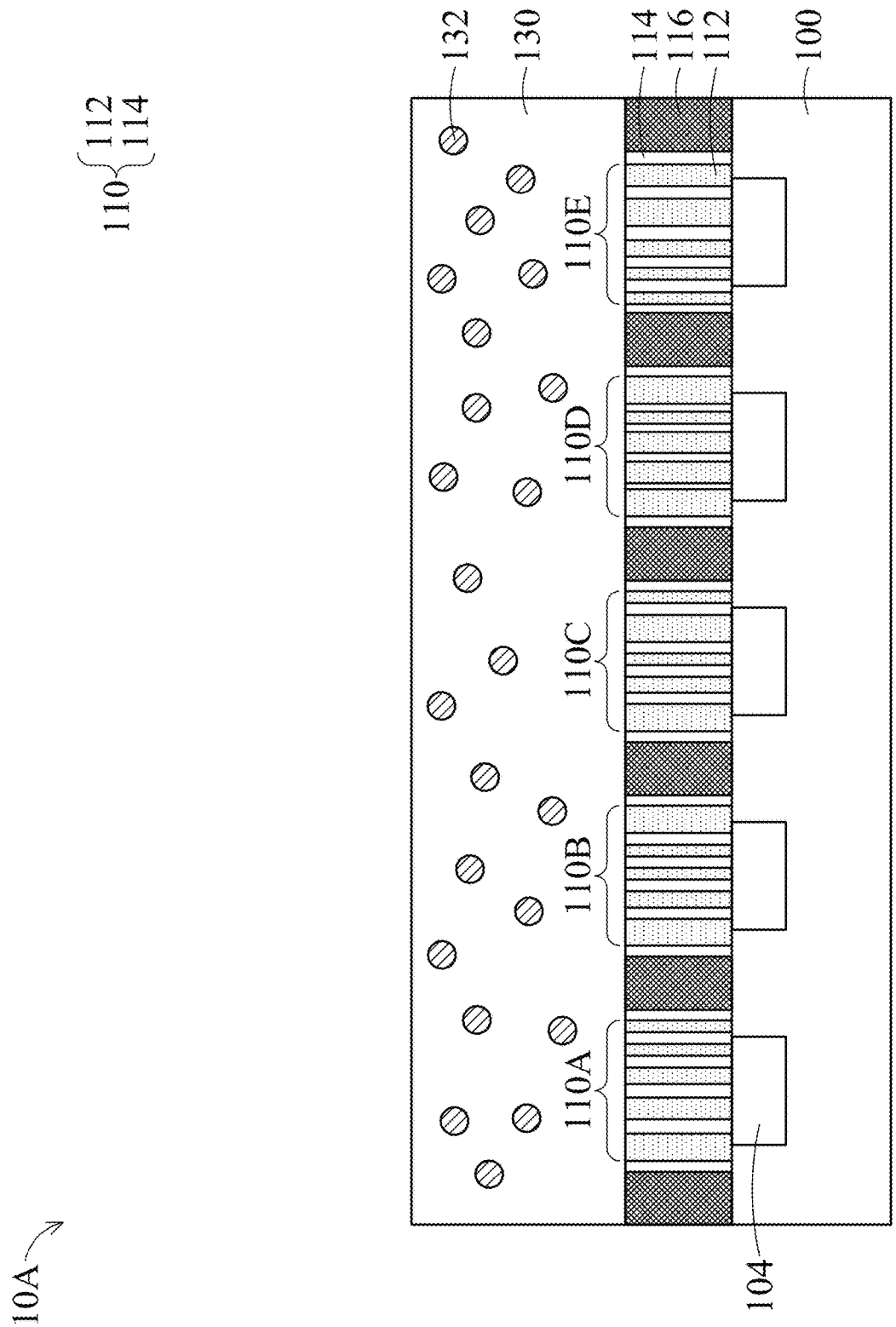
FIGS. 1A-1C are cross-sectional views of ambient light sensors with various designs, according to some embodiments of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean ±20% of the stated value, more typically ±10% of the stated value, more typically ±5% of the stated value, more typically ±3% of the stated value, more typically ±2% of the stated value, more typically ±1% of the stated value and even more typically ±0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the prior art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

In nature, ambient light may be a combination of various colors of all wavebands. In an ambient light sensor with multi-spectral configuration, multiple bandpass filters are implemented to detect the various colors of the ambient light. In some embodiments, the multiple bandpass filters may be designed to have specific full width at half maximum (FWHM), transmittance, central wavelength (CWL), and other parameters. For example, the full width at half maximum is the width of a spectrum curve measured between the two points on the transmittance axis, which are half the maximum amplitude. The transmittance is the fraction of the ambient light at a particular wavelength that the bandpass filters transmit. The central wavelength is the weighted average of wavelengths across the spectrum. The aforementioned parameters may determine the overall optical performance of the ambient light sensor.

The present disclosure incorporates a metasurface into the ambient light sensor to replace the conventional multiple bandpass filters. The metasurface includes nanostructures (such as nanoposts or pillars) that generate the necessary phase modulation for different wavelengths (or colors). When the nanostructures are arranged across the metasurface, different wavelengths (or colors) of the ambient light may be separated, which can serve as a bandpass filter. Through designing the dimensions and the pitches of the nanostructures using an algorithm, the colors of the ambient light may be transmitted through the designated areas, respectively.

Because the conventional multiple bandpass filters need to be patterned separately, the cycle time may be prolonged, while the cost of manufacturing may go up. The patterning may be a process cycle that includes deposition, photolithography, and etching. Each process cycle may only be used to form a single multiple bandpass filter. Since the former formed structure may create a step height for the latter process cycles, it would be more challenging to undergo the subsequent process cycles. For example, poor coating, stripping, or other cosmetic defects may be easily induced. The inventor has discovered that the implementation of the metasurface may simplify the overall production and may provide the same function as the multiple bandpass filters. Moreover, the metasurface can be patterned over a single process cycle, so the occurrence of cosmetic defects may be reduced. It should be appreciated that even if the multi-spectral configuration of the ambient light sensor were to expand to accommodate additional colors, the metasurface can be designed accordingly, yet the metasurface can still be patterned over a single process cycle. As a result, the metasurface can be fabricated quicker and cheaper.

Figure 1B:
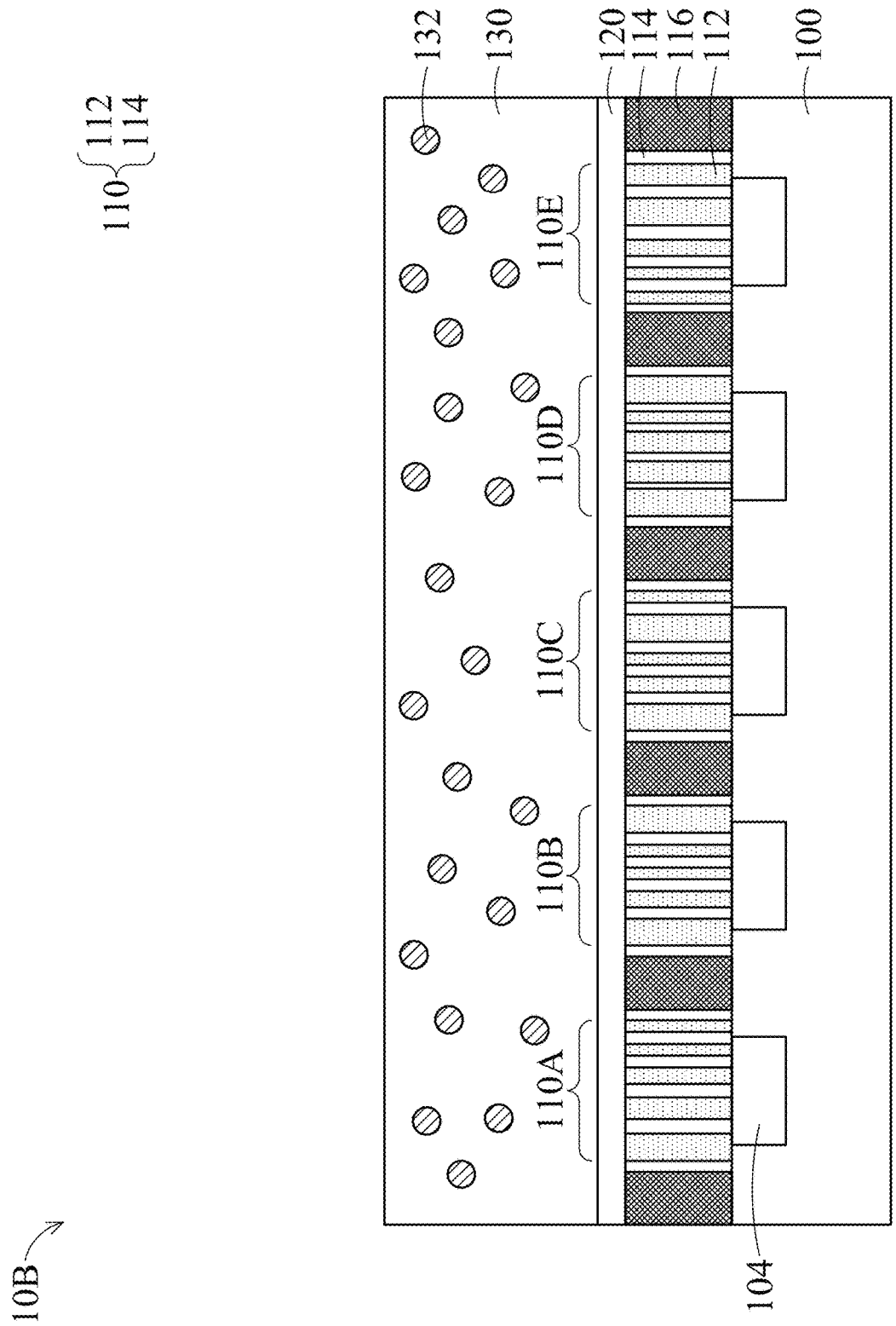
Figure 1C:
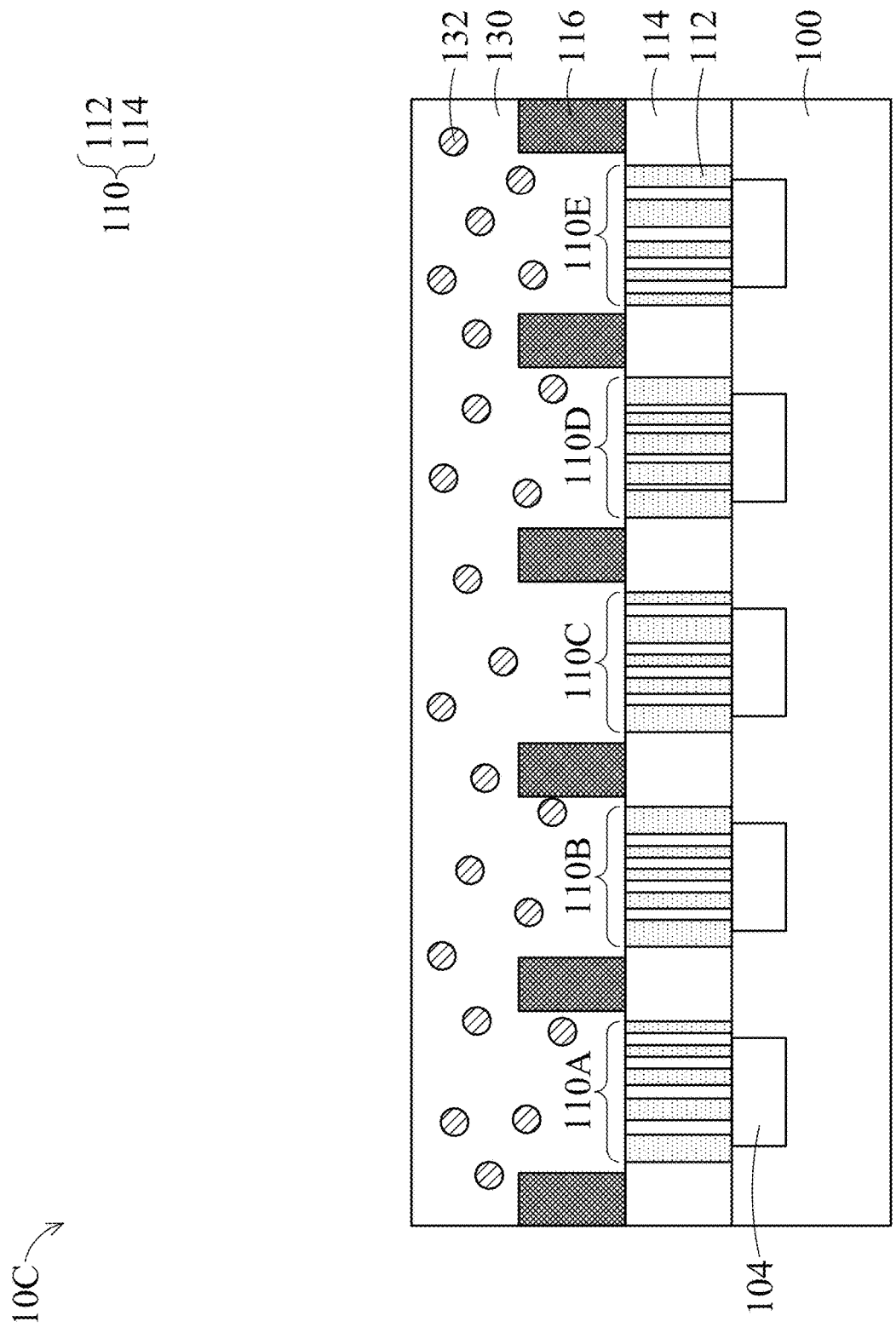

FIGS. 1A-1C are cross-sectional views of ambient light sensors 10A, 10B, and 10C with various designs, according to some embodiments of the present disclosure. According to some embodiments of the present disclosure, the ambient light sensors 10A, 10B, and 10C may include a substrate 100, a plurality of sensing portions 104, a metasurface 110, an aperture layer 116, a glue layer 130, and diffuse particles 132. The metasurface 110 may include a plurality of nanostructures 112 and a filling layer 114. Additionally, the aperture layer 116 may laterally separate the metasurface 110 into a sub-meta group 110A, a sub-meta group 110B, a sub-meta group 110C, a sub-meta group 110D, and a sub-meta group 110E.

Referring to FIG. 1A, the substrate 100 may be, for example, a wafer or a chip, but the present disclosure is not limited thereto. In some embodiments, the substrate 100 may be a semiconductor substrate, for example, silicon substrate. Furthermore, in some embodiments, the semiconductor substrate may also be an elemental semiconductor (such as germanium), a compound semiconductor (such as gallium nitride (GaN), silicon carbide (SiC), gallium arsenide (GaAs), gallium phosphide (GaP), indium phosphide (InP), indium arsenide (InAs), or indium antimonide (InSb)), an alloy semiconductor (such as silicon germanium (SiGe) alloy, gallium arsenide phosphide (GaAsP) alloy, aluminum indium arsenide (AlInAs) alloy, aluminum gallium arsenide (AlGaAs) alloy, gallium indium arsenide (GaInAs) alloy, gallium indium phosphide (GaInP) alloy, or gallium indium arsenide phosphide (GaInAsP) alloy), or a combination thereof. In some embodiments, the substrate 100 may be a photoelectric conversion substrate, such as a silicon substrate or an organic photoelectric conversion layer.

In other embodiments, the substrate 100 may also be a semiconductor on insulator (SOI) substrate. The semiconductor on insulator substrate may include a base plate, a buried oxide layer disposed on the base plate, and a semiconductor layer disposed on the buried oxide layer. Furthermore, the substrate 100 may be an n-type or a p-type conductive type.

In some embodiments, the substrate 100 may include various p-type doped regions and/or n-type doped regions (not shown) formed by, for example, an ion implantation and/or a diffusion process. In some embodiments, transistors, photodiodes, or the like, may be formed at the active regions, which are defined by an isolation structure.

In some embodiments, the isolation structure may be embedded within the substrate 100 to define active regions and to electrically isolate active region elements within or above the substrate 100, but the present disclosure is not limited thereto. The isolation structure may be deep trench isolation (DTI) structure, shallow trench isolation (STI) structure, and local oxidation of silicon (LOCOS) structure. In some embodiments, the formation of the isolation structure may include, for example, forming an insulating layer on the substrate 100. Through a suitable photolithography process and a suitable etching process, trenches may be formed extending into the substrate 100.

Next, a liner of rich nitrogen-containing materials (such as silicon oxynitride (SiON)) may be grown conformally along the trenches. After that, insulating materials (such as silicon dioxide ($SiO_2$), silicon nitride (SiN), or silicon oxynitride) may be filled into the trenches by a suitable deposition process. An annealing process may then be performed on the insulating materials in the trenches, followed by a planarization process, such as chemical mechanical polish (CMP), on the substrate 100 to remove excessive insulating materials, so the insulating materials in the trenches are level with the top surface of the substrate 100.

Still referring to FIG. 1A, the plurality of sensing portions 104 are embedded in the substrate 100. In some embodiments, the plurality of sensing portions 104 are photodiodes. Each of the plurality of sensing portions 104 is configured to sense the ambient light and to generate an intensity signal according to the intensity of the ambient light it senses. The electric signal is formed by the intensity signals, and may be numerical data or readings of the electron amount.

Referring to FIG. 1A, the metasurface 110 may be disposed on the substrate 100. In some embodiments, the sub-meta group 110A, the sub-meta group 110B, the sub-meta group 110C, the sub-meta group 110D, and the sub-meta group 110E may correspond respectively to the sensing portions 104 within the substrate 100 of the ambient light sensor 10A. According to some embodiments of the present disclosure, the metasurface 110 may function as a spectrum selective layer, which may separate different wavelengths (or colors) of the ambient light using diffraction or refraction characteristics. As a result, each of the sub-meta group 110A, the sub-meta group 110B, the sub-meta group 110C, the sub-meta group 110D, and the sub-meta group 110E may be designed to allow only the desired color to transmit, while the unwanted colors may be absorbed or reflected away by the sub-meta group 110A, the sub-meta group 110B, the sub-meta group 110C, the sub-meta group 110D, and the sub-meta group 110E.

In some embodiments, each of the sub-meta group 110A, the sub-meta group 110B, the sub-meta group 110C, the sub-meta group 110D, and the sub-meta group 110E allows a predetermined range of wavelengths of light to pass through. For example, the red light has wavelengths in a range from 620 nm to 750 nm to transmit to the corresponding sensing portions 104, the green light has wavelengths in a range from 495 nm to 570 nm to transmit to the corresponding sensing portions 104, and the blue light has wavelengths in a range from 450 nm to 495 nm to transmit to the corresponding sensing portions 104. In a specific embodiment of the present disclosure, the sub-meta group 110A, the sub-meta group 110B, the sub-meta group 110C, the sub-meta group 110D, and the sub-meta group 110E may transmit the colors of red, yellow, green, blue, and magenta, respectively, or more specific wavelength of colors including far infrared (FIR) and short-wave infrared (SWIR).

As mentioned previously, the metasurface 110 may include the plurality of nanostructures 112 and the filling layer 114. In some embodiments, the filling layer 114 may laterally surround the plurality of nanostructures 112. The thickness of the metasurface 110 is between 10 nm and 10 μm. In some embodiments, the filling layer 114 and the plurality of nanostructures 112 may be the same thickness. In other embodiments, the thickness of the filling layer 114 and that of the plurality of nanostructures 112 may vary, depending on the application and the design requirements. Each of the plurality of nanostructures 112 has a circular shape, a rectangular shape, a hexagonal shape, or any other symmetrical shape and asymmetrical shape from top view. The dimension of each of the plurality of nanostructures 112 from top view may be between 2 nm and 2000 nm. According to some embodiments of the present disclosure, the refractive index of the filling layer 114 is less than the refractive index of the plurality of nanostructures 112. The refractive index of the filling layer 114 may be between 1.0 and 3.0. The refractive index of the plurality of nanostructures 112 may be higher than 1.4, for example, between 1.4 and 4.0. In some embodiments, the filling layer 114 may be air, which has the refractive index of 1.

Materials of the plurality of nanostructures 112 may include conductive or dielectric materials, such as aluminum oxide ($Al_2O_3$), niobium (V) oxide ($Nb_2O_5$), gallium nitride, tantalum pentoxide ($Ta_2O_5$), titanium nitride (TiN), titanium dioxide ($TiO_2$), silicon nitride, silane ($SiH_4$), silicon oxide (SiO), the like, or a combination thereof. Materials of the filling layer 114 may include polymers or dielectric materials, such as silicon oxide, silicon dioxide ($SiO_2$), polyethylene terephthalate (PET) resins, polycarbonate (PC) resins, polyimide (PI) resins, polymethylmethacrylates (PMMA), polystyrene resins, polyethersulfone (PES) resins, polythiophene (PT) resins, phenol novolac (PN), spin on glass (SOG) resin, spin on dielectric (SOD), the like, or a combination thereof.

The metasurface 110 may be formed by patterning the plurality of nanostructures 112, followed by filling the space between the plurality of nanostructures 112 with the filling layer 114. Initially, a material layer may be deposited on the substrate 100 using a suitable deposition process, such as chemical vapor deposition (CVD), high-density plasma chemical vapor deposition (HDP-CVD), plasma-enhanced chemical vapor deposition (PECVD), flowable chemical vapor deposition (FCVD), sub-atmospheric chemical vapor deposition (SACVD), or physical vapor deposition (PVD), or atomic layer deposition (ALD), the like, or a combination thereof. Next, a hard mask layer (not shown) is coated on the material layer. In some embodiments, the hard mask layer may be a photoresist. A photolithography process is performed to pattern the hard mask layer, which may include resist coating, soft baking, exposure, post-exposure baking, development, the like, or a combination thereof. After that, an etching process (such as dry etching, wet etching, the like, or a combination thereof) is performed on the material layer by using the patterned hard mask. After the etching process, a portion of the material layer is removed on the substrate 100, and multiple openings are formed therein. As mentioned previously, the openings will be subsequently filled with the filling layer 114.

Still referring to FIG. 1A, the aperture layer 116 is disposed horizontally between neighboring sub-meta groups. For example, the aperture layer 116 may define the border of the sub-meta group 110A, the sub-meta group 110B, the sub-meta group 110C, the sub-meta group 110D, and the sub-meta group 110E. According to some embodiments of the present disclosure, when the ambient light is being transmitted and separated through the sub-meta group 110A, the sub-meta group 110B, the sub-meta group 110C, the sub-meta group 110D, or the sub-meta group 110E, the aperture layer 116 may isolate the light ray within the specific sub-meta group to serve as the light-blocking function.

In a conventional design, after the multiple bandpass filters were arranged and placed side by side on the substrate, an aperture layer is conformally deposited on the collective structure of the multiple bandpass filters. The aperture layer may then be patterned in order to expose each of the underlying multiple bandpass filters. As mentioned previously, the multiple bandpass filters need to be patterned separately, and the former formed structure may create a step height that poses a greater challenge for the subsequent process cycles. Ideally, the adjoining interface between neighboring multiple bandpass filters should be vertical. However, due to the process variation caused by the step height issue, the adjoining multiple bandpass filters may not be aligned precisely, which results in some adjoining interfaces being slanted. When the ambient light enters at the normal direction, the slanted interface may generate scattered light rays of mixed colors, which are considered to be optical noise. The normal direction is a direction perpendicular to the surface of the substrate. If these scatter light rays of mixed colors were received by the sensing portions, unwanted signals may be converted. For this reason, only the central portions of the multiple bandpass filters from top view are exposed. The area near the adjoining interfaces may remain covered by the aperture layer, thus it is known as an ineffective region. The ineffective region of the adjoining interfaces may have a dimension in a range between 20 μm and 25 μm from top view. For the ineffective region at the edge of the collective structure of the multiple bandpass filters, the dimension thereof may be between 10 µm and 15 µm from top view.

According to some embodiments of the present disclosure, the metasurface 110 may be utilized to replace the conventional multiple bandpass filters. Since the metasurface 110 may be patterned over a single process cycle, there is a higher flexibility to design the placement of each sub-meta group. The step height issue during patterning and the misalignment issue between neighboring multiple bandpass filters may both be eliminated. The dimension of the aperture layer 116 between neighboring sub-meta groups (or the ineffective region of the adjoining interfaces) may be reduced to approximately 10 µm from top view. It should be understood that, even though the sub-meta groups are not placed adjoining each other, the presence of the aperture layer 116 is still necessary to ensure the neighboring sub-meta groups are spaced apart to avoid any unwanted interacting effect (for example, the diffraction behavior).

The thickness of the aperture layer 116 may be the same as that of the metasurface 110. Materials of the aperture layer 116 may include black photoresist, dielectric materials, opaque metals (such as tungsten (W), aluminum (Al)), opaque metal nitride (such as titanium nitride), opaque metal oxide (such as titanium oxide (TiO)), other suitable materials, or a combination thereof, but the present disclosure is not limited thereto. The aperture layer 116 may be formed by any suitable deposition process, such as spin-on coating process, chemical vapor deposition, physical vapor deposition (PVD), atomic layer deposition (ALD), other suitable methods, or a combination thereof.

Referring to FIG. 1A, the glue layer 130 may be disposed on the metasurface 110 and the aperture layer 116. In some embodiments, the glue layer 130 may cover the metasurface 110 and the aperture layer 116. According to some embodiments of the present disclosure, the glue layer 130 may provide the necessary medium for the ambient light (especially the inclined light rays) to diffuse into a more normal distribution spectrum. Moreover, the glue layer 130 may provide the mechanical protection for the underlying structures, as well as the adhesion with any overlying component. The refractive index of the glue layer 130 is between 1.0 and 3.0. The thickness of the glue layer 130 may be between 100 nm and 100 µm.

The glue layer 130 may be a dielectric material including, for example, silicon oxide, silicon nitride, silicon carbide, silicon carbonitride (SiCN), silicon oxynitride, silicon oxynitrocarbide ($SiO_xN_yC_{1-x-y}$, wherein x and y are in a range from 0 to 1), tetra ethyl ortho silicate (TEOS), undoped silicate glass, or doped silicon oxide (such as boron-doped phosphosilicate glass (BPSG), fused silica glass (FSG), phosphosilicate glass (PSG), boron doped silicon glass (BSG), or the like), low-k dielectric materials, organic transparent materials, the like, or a combination thereof, but the present disclosure is not limited thereto. The formation of the glue layer 130 may include any suitable deposition process mentioned above. After that, a planarization process, such as chemical mechanical polish, may be performed to form a planarized top surface.

Still referring to FIG. 1A, the diffuse particles 132 may be randomly distributed within the glue layer 130. In some embodiments, the glue layer 130 and the diffuse particles 132 may be collectively known as a diffuser structure for the backend fabrication. In some embodiments, the diffuser structure may be applied to gather the ambient light from a variety of angles for reception by the plurality of sensing portions 104. According to some embodiments of the present disclosure, the diffuse particles 132 may be designed to interfere with optical propagation, so the entry direction of the inclined light rays may be adjusted close to the normal direction. In other words, the diffuse particles 132 may enhance the reception of off-axis ambient light, and from the perspective of the ambient light sensor 10A, the ambient light source may become more uniformly detected. As a result, the optical readings of the ambient light sensor 10A may be less dependent on the relative orientations between the ambient light sensor 10A and the ambient light source.

The diffuse particles 132 may have round shape, oval shape, or any suitable geometrical shape from the cross-sectional view. The dimension of each of the diffuse particles 132 may be between nm and 10 µm. Materials of the diffuse particles 132 may include transparent conductive materials, such as indium tin oxide (ITO), fluorine-doped tin oxide (FTO), zinc oxide (ZnO), tin oxide (SnO), indium zinc oxide (IZO), indium gallium zinc oxide (IGZO), indium tin zinc oxide (ITZO), antimony tin oxide (ATO), aluminum-doped zinc oxide (AZO), titanium dioxide, tantalum pentoxide, niobium (V) oxide, silicon nitride, gallium nitride, aluminum nitride (AlN), the like, or a combination thereof. The diffuse particles 132 may be incorporated into the glue layer 130 by casting, extrusion, injection molding, rolling, the like, or a combination thereof.

Referring to FIG. 1B, the cross-sectional view of the ambient light sensor 10B is illustrated. In comparison with FIG. 1A, a spacer layer 120 may be disposed between the metasurface 110 and the diffuser structure (for example, the glue layer 130 and the diffuse particles 132). The features of the substrate 100, the plurality of sensing portions 104, the metasurface 110, the aperture layer 116, the glue layer 130, and the diffuse particles 132 are similar to those illustrated in FIG. 1A, and the details are not described again herein to avoid repetition.

Still referring to FIG. 1B, the spacer layer 120 may separate the metasurface 110 and the diffuser structure (for example, the glue layer 130 and the diffuse particles 132), depending on the application or the design requirements. In some embodiments, the spacer layer 120 may provide the necessary travel paths for the diffused light rays to enter the metasurface 110. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

The thickness of the spacer layer 120 may be between 100 nm and 50 µm. Materials of the spacer layer 120 may be similar to those of the filling layer 114, and the details are not described again herein to avoid repetition. The spacer layer 120 may be formed by any suitable deposition process mentioned above. In other embodiments, the filling layer 114 may be deposited in a way exceeding the plurality of nanostructures 112. For example, the filling layer 114 may completely cover the plurality of nanostructures 112, so the top surface of the filling layer 114 is higher than the top surface of the plurality of nanostructures 112. Under such circumstance, the portion of the filling layer 114 above the top surface of the plurality of nanostructures 112 may be known as the spacer layer 120. Therefore, the materials of the filling layer 114 and the materials of the spacer layer 120 may be substantially identical.

Referring to FIG. 1C, the cross-sectional view of the ambient light sensor 10C is illustrated. In comparison with FIG. 1A, the aperture layer 116 may be disposed above, instead of within, the metasurface 110. The features of the substrate 100, the plurality of sensing portions 104, the metasurface 110, the aperture layer 116, the glue layer 130, and the diffuse particles 132 are similar to those illustrated in FIG. 1A, and the details are not described again herein to avoid repetition.

Still referring to FIG. 1C, the metasurface 110 and the aperture layer 116 are placed at different levels, depending on the application or the design requirements. More specifically, the aperture layer 116 may be disposed directly above the filling layer 114. In some embodiments, the aperture layer 116 may be disposed within the glue layer 130 to funnel the diffused light rays before they are transmitted through the metasurface 110. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

Figure 2A:
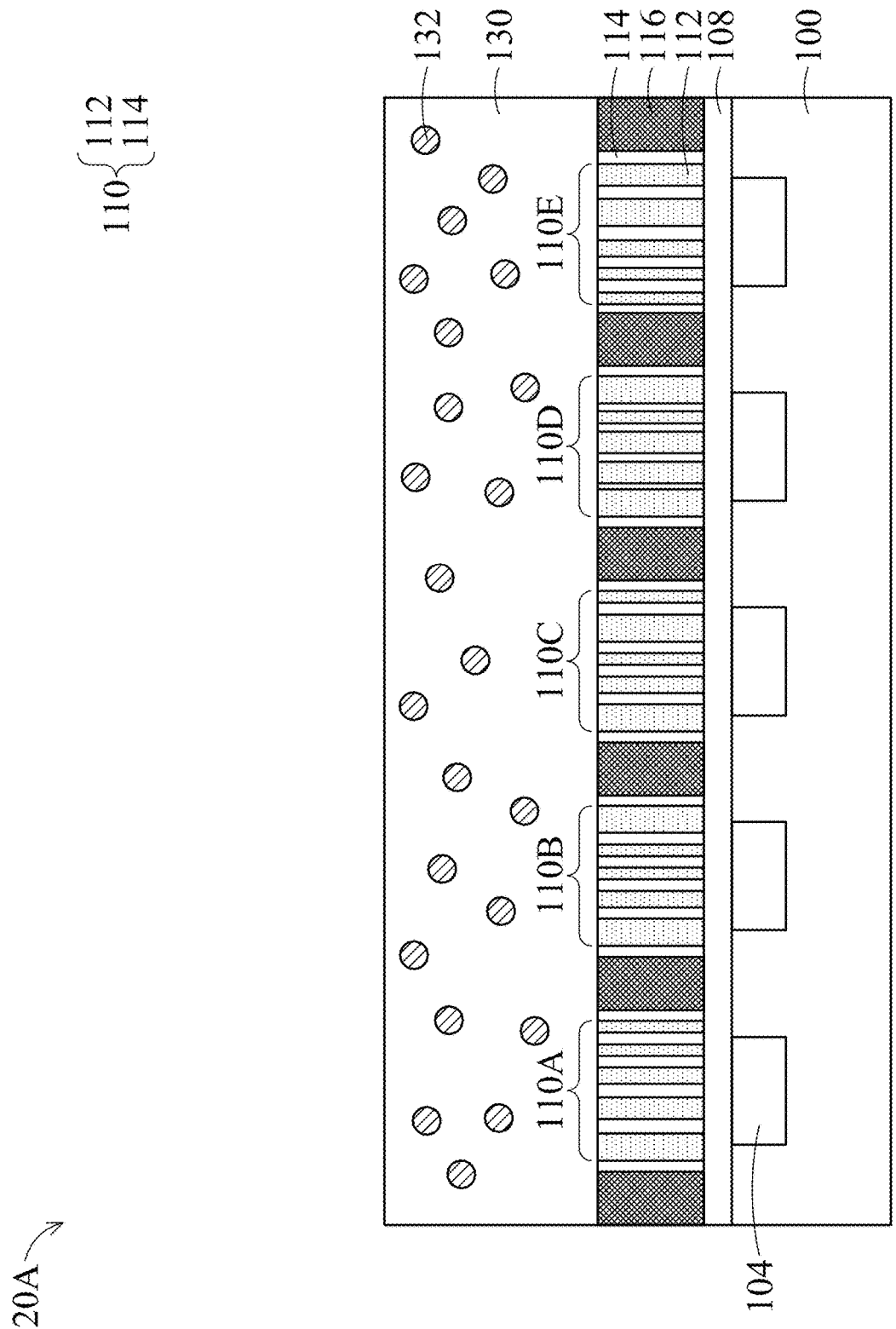
FIGS. 2A-2C are cross-sectional views of ambient light sensors with various designs, according to other embodiments of the present disclosure.
Figure 2B:
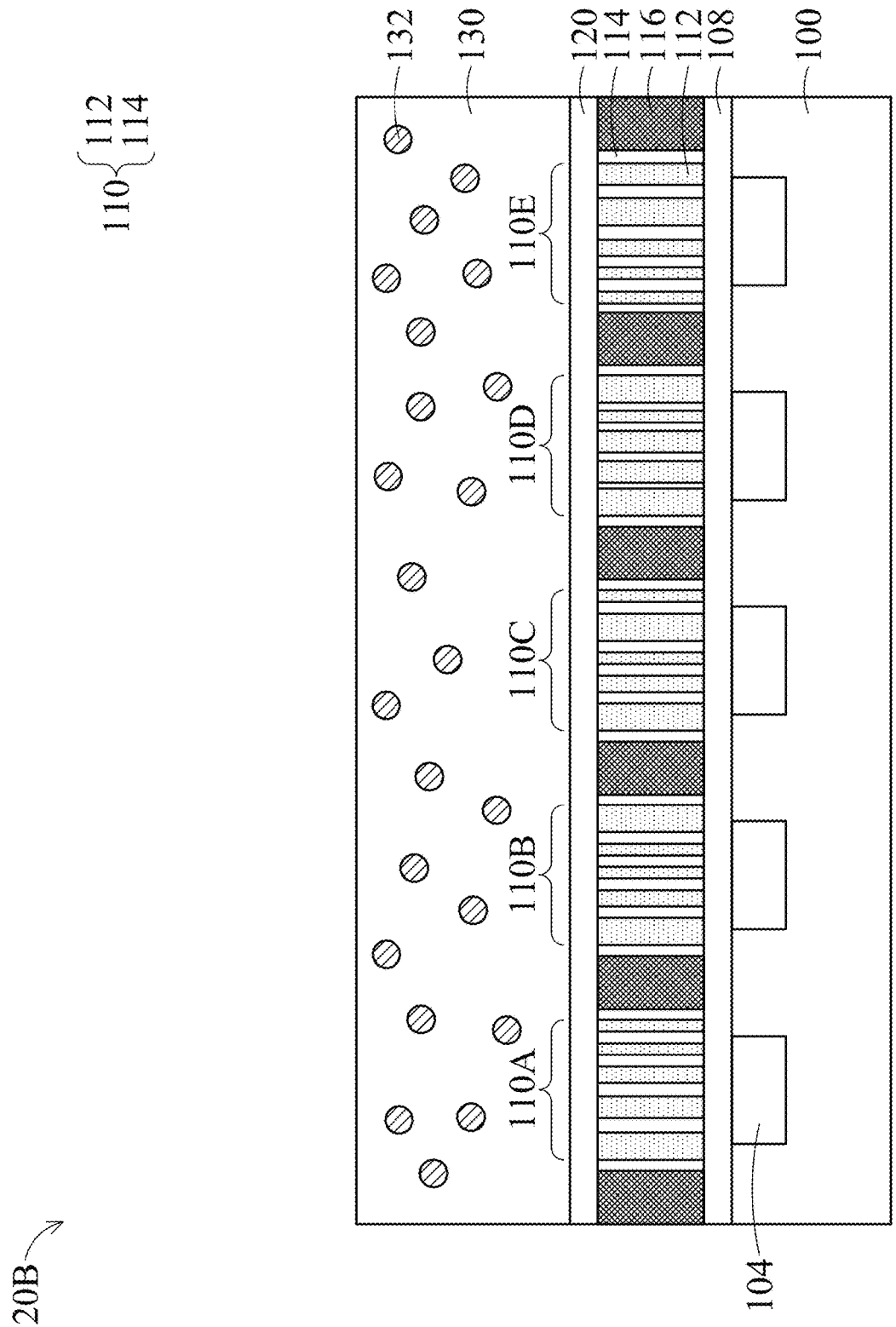
Figure 2C:
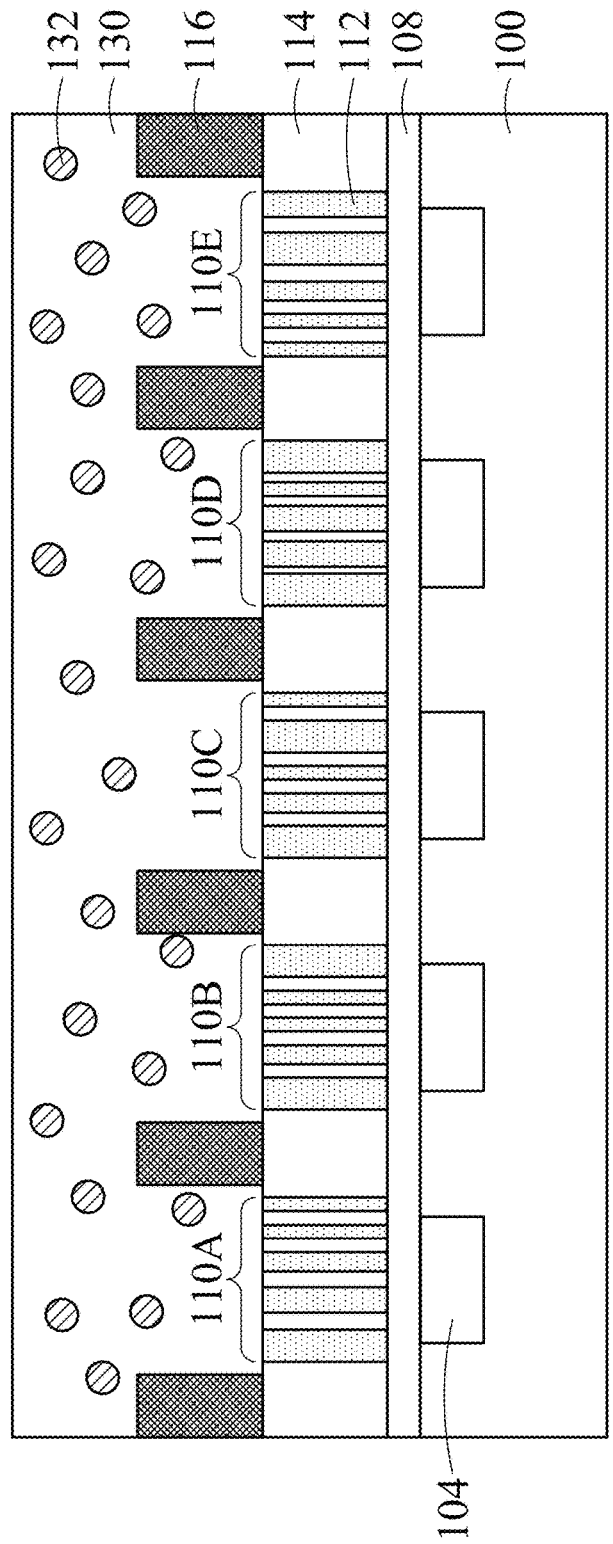

FIGS. 2A-2C are cross-sectional views of ambient light sensors 20A, 20B, and 20C with various designs, according to other embodiments of the present disclosure. In some embodiments, additional film layers may be disposed between the substrate 100 and the metasurface 110, depending on the application or the design requirements. The features of the substrate 100, the plurality of sensing portions 104, the metasurface 110, the aperture layer 116, the spacer layer 120, the glue layer 130, and the diffuse particles 132 are similar to those illustrated in FIGS. 1A-1C, and the details are not described again herein to avoid repetition.

Referring to FIG. 2A, the cross-sectional view of the ambient light sensor 20A is illustrated. In comparison with FIG. 1A, a first transparent conducting film (TCF) 108 may be disposed between the substrate 100 and the metasurface 110. According to some embodiments of the present disclosure, the first transparent conducting film 108 may input or output additional electrical signals for the plurality of sensing portions 104 to convert. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 1101D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper. The thickness of the first transparent conducting film 108 may be between 10 nm and 200 nm. The first transparent conducting film 108 may be a transparent conducting oxide (TCO), which includes indium tin oxide (ITO), fluorine-doped tin oxide (FTO), zinc oxide (ZnO), or aluminum-doped zinc oxide (AZO). The first transparent conducting film 108 may be formed by any suitable deposition process mentioned above.

Referring to FIG. 2B, the cross-sectional view of the ambient light sensor 20B is illustrated. In comparison with FIG. 1B, the first transparent conducting film 108 may be disposed between the substrate 100 and the metasurface 110. The feature of the first transparent conducting film 108 is similar to that illustrated in FIG. 2A, and the details are not described again herein to avoid repetition. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

Referring to FIG. 2C, the cross-sectional view of the ambient light sensor 20C is illustrated. In comparison with FIG. 1C, the first transparent conducting film 108 may be disposed between the substrate 100 and the metasurface 110. The feature of the first transparent conducting film 108 is similar to that illustrated in FIG. 2A, and the details are not described again herein to avoid repetition. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

Figure 3A:
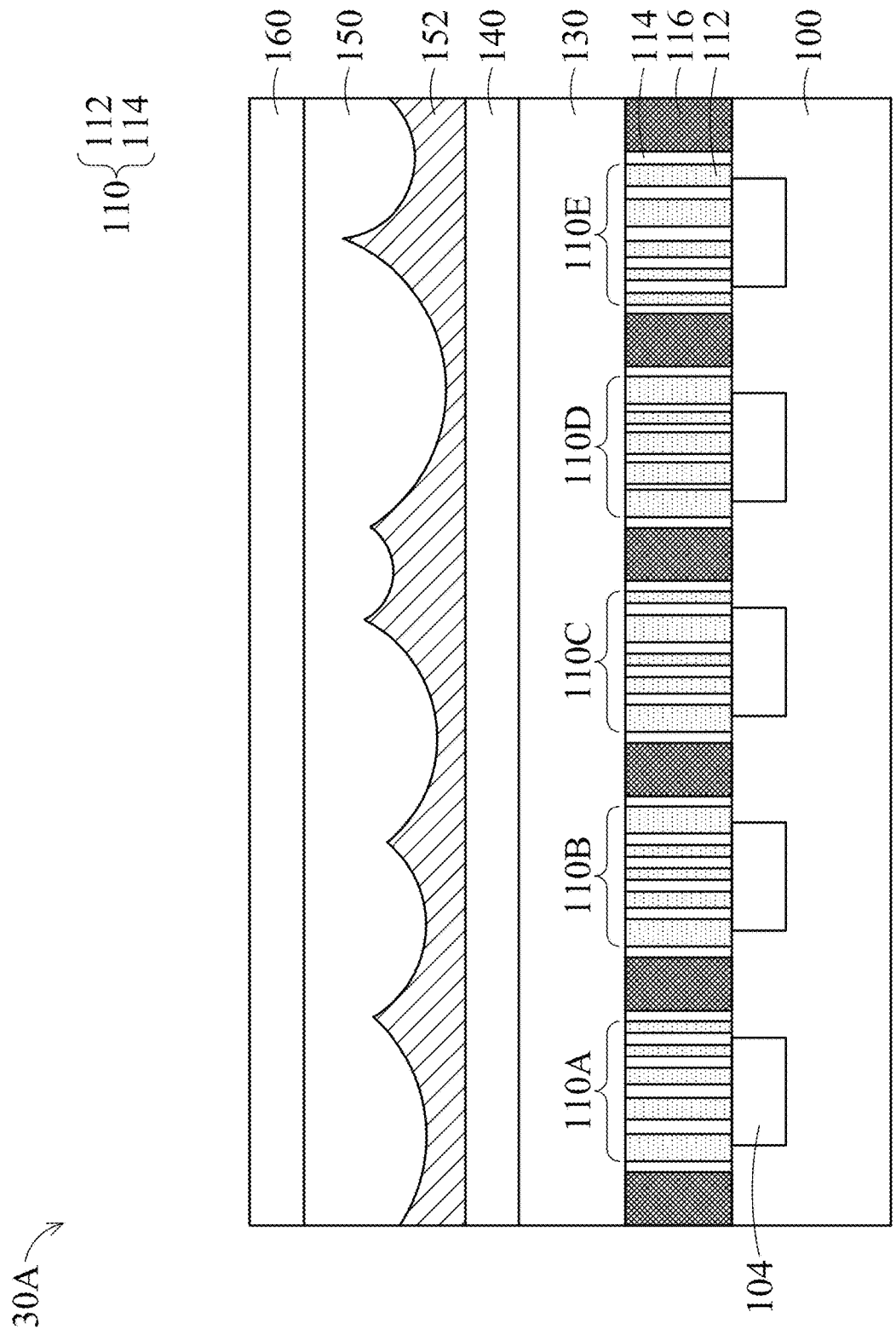
FIGS. 3A-3C are cross-sectional views of ambient light sensors with various designs, according to some embodiments of the present disclosure.
Figure 3B:
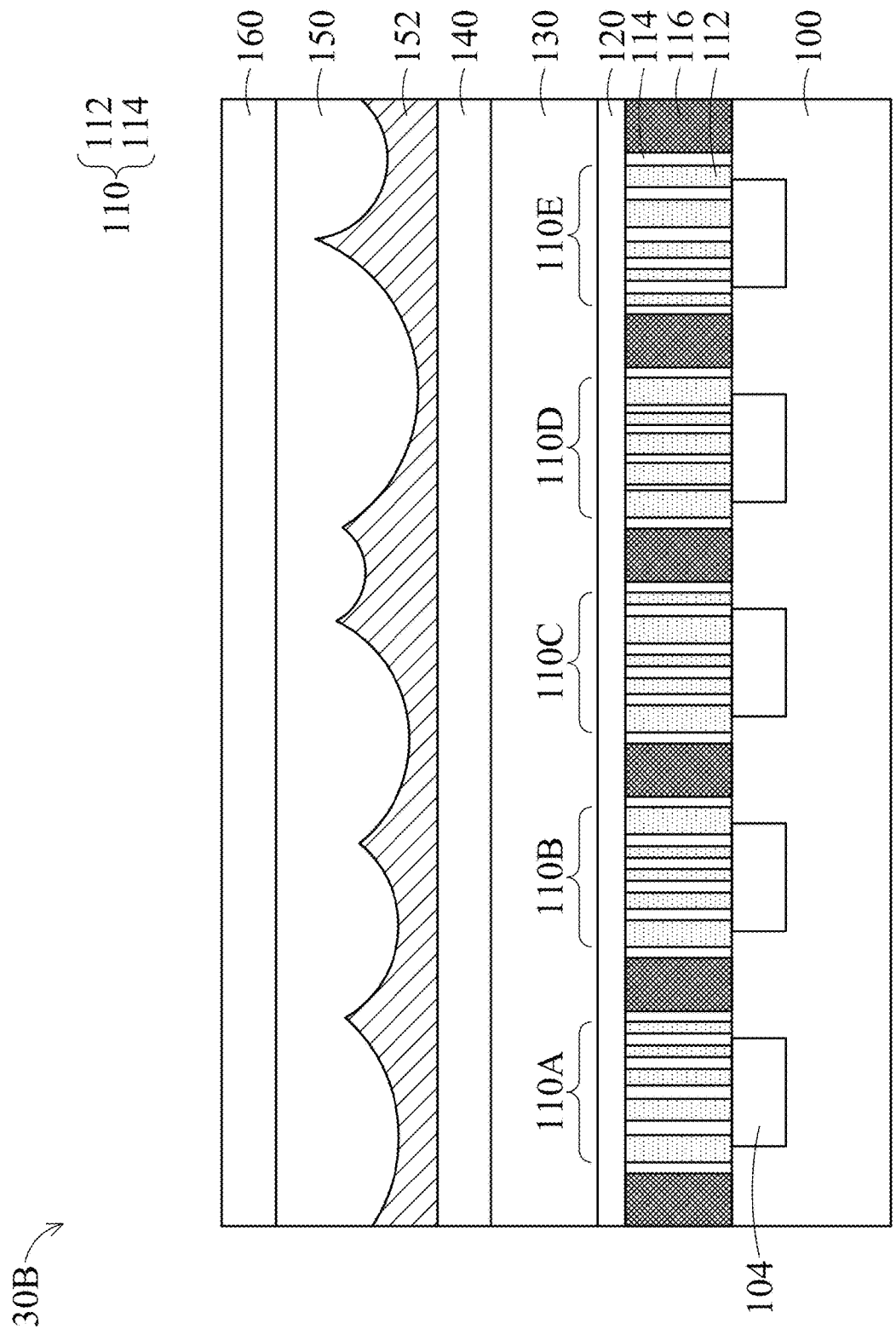
Figure 3C:
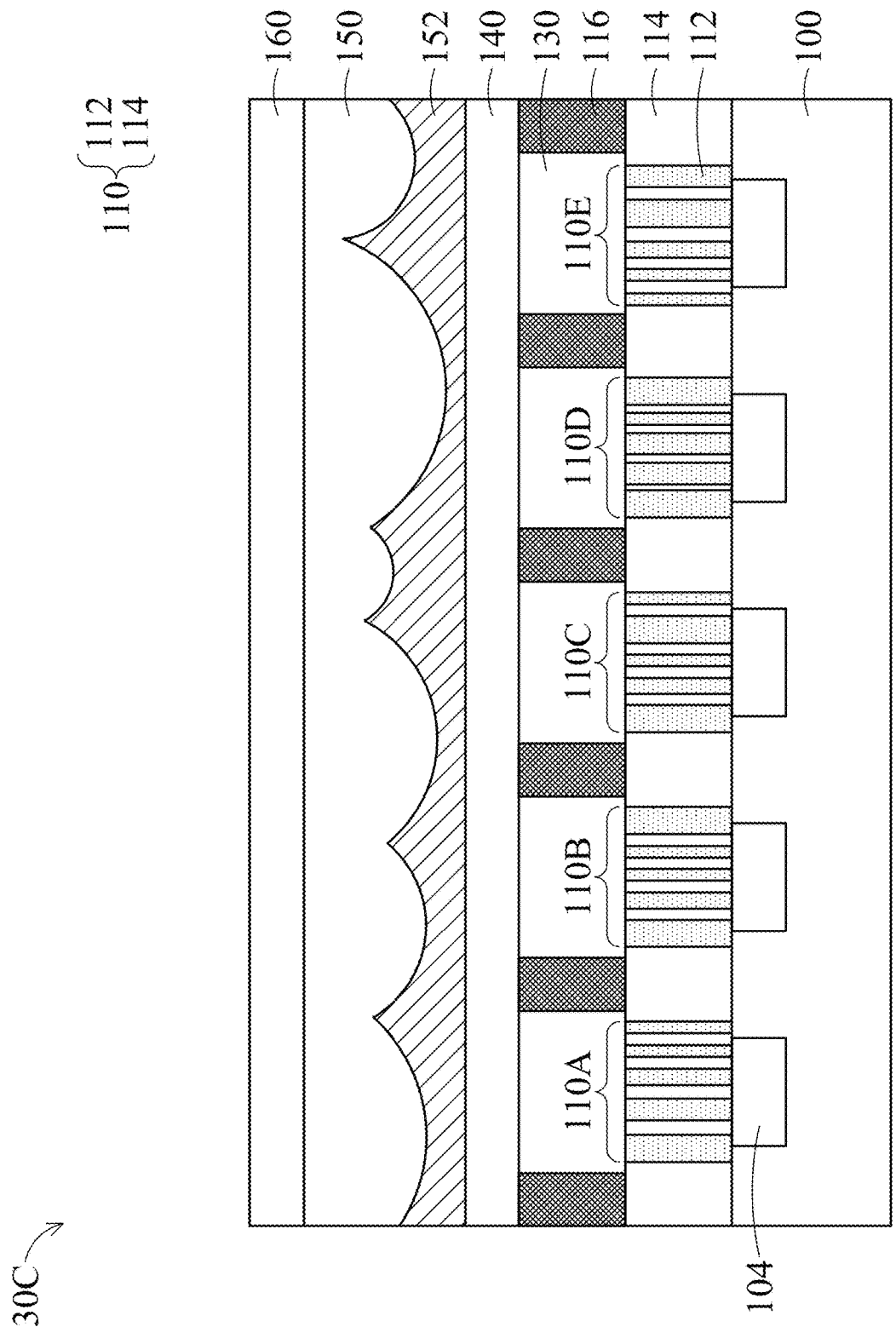

FIGS. 3A-3C are cross-sectional views of ambient light sensors 30A, 30B, and 30C with various designs, according to some embodiments of the present disclosure. In some embodiments, a different diffuser structure may be implemented, depending on the application or the design requirements. The features of the substrate 100, the plurality of sensing portions 104, the metasurface 110, the aperture layer 116, and the spacer layer 120, are similar to those illustrated in FIGS. 1A-1C, and the details are not described again herein to avoid repetition.

Referring to FIG. 3A the cross-sectional view of the ambient light sensor 30A is illustrated. In comparison with FIG. 1A, the diffuser structure having the glue layer 130 and the diffuse particles 132 is replaced by a new diffuse structure having a glue layer 130, a lower glass layer 140, a glue layer 150, a lens layer 152, and an upper glass layer 160. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

Still referring to FIG. 3A, the glue layer 130 may be disposed on the metasurface 110 and the aperture layer 116. The feature of the glue layer 130 shown in FIG. 3A is similar to that shown in FIG. 1A, and the details are not described again herein to avoid repetition. Instead of incorporating the diffuse particles 132, the lower glass layer 140 may be disposed on the glue layer 130. The lower glass layer 140 may be functioned as a substrate for a lens structure to be produced. The thickness of the lower glass layer 140 may be between 150 μm and 700 μm. Materials of the lower glass layer 140 may include polymers, resins, or any suitable light-transmissive insulation materials. The lower glass layer 140 may be formed by any suitable deposition process mentioned above.

Referring to FIG. 3A, the lens layer 152 may be disposed on the lower glass layer 140. In some embodiments, the lens layer 152 has a curved surface, for example, an array of concave lens profiles inwardly facing the metasurface 110. The array of concave lens profiles may have various radius of curvature. According to some embodiments of the present disclosure, when the ambient light reaches the lens layer 152, the entry direction of the inclined light rays may be adjusted close to the normal direction. Similar to the diffuse particles 132, the lens layer 152 may enhance the reception of off-axis ambient lights, and from the perspective of the ambient light sensor 30A, the ambient light source may become more uniformly detected. As a result, the optical readings of the ambient light sensor 30A may be less dependent on the relative orientation between the ambient light sensor 30A and the ambient light source. The thickness of the lens layer 152 may be between 500 nm and 5 µm. Materials of the lens layer 152 may include tantalum pentoxide, titanium nitride, titanium dioxide, silicon nitride, silane, silicon oxide, resin, the like, or a combination thereof. The lens layer 152 may include organic or inorganic materials, depending on the application or the design requirements. The lens layer 152 may be formed by any suitable deposition process or resin coating process mentioned above. The lens pattern may be directly defined by lithography or pressed against a mold, which contains a three-dimensional lens pattern with a shape opposite to the desired shape for the lens layer 152. After that, the lens pattern may be transferred to the deposited film by any suitable etching process.

Still referring to FIG. 3A, the glue layer 150 may be disposed on the lens layer 152. In some embodiments, the glue layer 150 fills the array of concave lens profiles of the lens layer 152. The feature of the glue layer 150 may be similar to that of the glue layer 130, and the details are not described again herein to avoid repetition. Next, the upper glass layer 160 may be disposed on the glue layer 150. The feature of the upper glass layer 160 may be similar to that of the lower glass layer 140, and the details are not described again herein to avoid repetition. It should be noted that the lower glass layer 140 and the upper glass layer 160 may confine the glue layer 150 and the lens layer 152. The glue layer 130 and the glue layer 150 may provide adhesion to the lower glass layer 140 and the upper glass layer 160, respectively. It should be appreciated that the lower glass layer 140 and the upper glass layer 160 are optional. For example, the lower glass layer 140, the upper glass layer 160, or both the lower glass layer 140 and the upper glass layer 160 may be eliminated by directly process lens layer on the sensor structure. Since the lower glass layer 140 or the upper glass layer 160 usually have relatively large thickness, omitting the lower glass layer 140 and/or the upper glass layer 160 can significantly reduce the overall size of the ambient light sensor 30A.

Referring to FIG. 3B, the cross-sectional view of the ambient light sensor 30B is illustrated. In comparison with FIG. 1B, the diffuser structure having the glue layer 130, the lower glass layer 140, the glue layer 150, the lens layer 152, and the upper glass layer 160 may be fabricated over the metasurface 110. The features of the glue layer 130, the lower glass layer 140, the glue layer 150, the lens layer 152, and the upper glass layer 160 are similar to those illustrated in FIG. 3A, and the details are not described again herein to avoid repetition. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

Referring to FIG. 3C, the cross-sectional view of the ambient light sensor 30C is illustrated. In comparison with FIG. 1C, the diffuser structure having the glue layer 130, the lower glass layer 140, the glue layer 150, the lens layer 152, and the upper glass layer 160 may be fabricated over the metasurface 110. The features of the glue layer 130, the lower glass layer 140, the glue layer 150, the lens layer 152, and the upper glass layer 160 are similar to those illustrated in FIG. 3A, and the details are not described again herein to avoid repetition. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

Figure 4A:
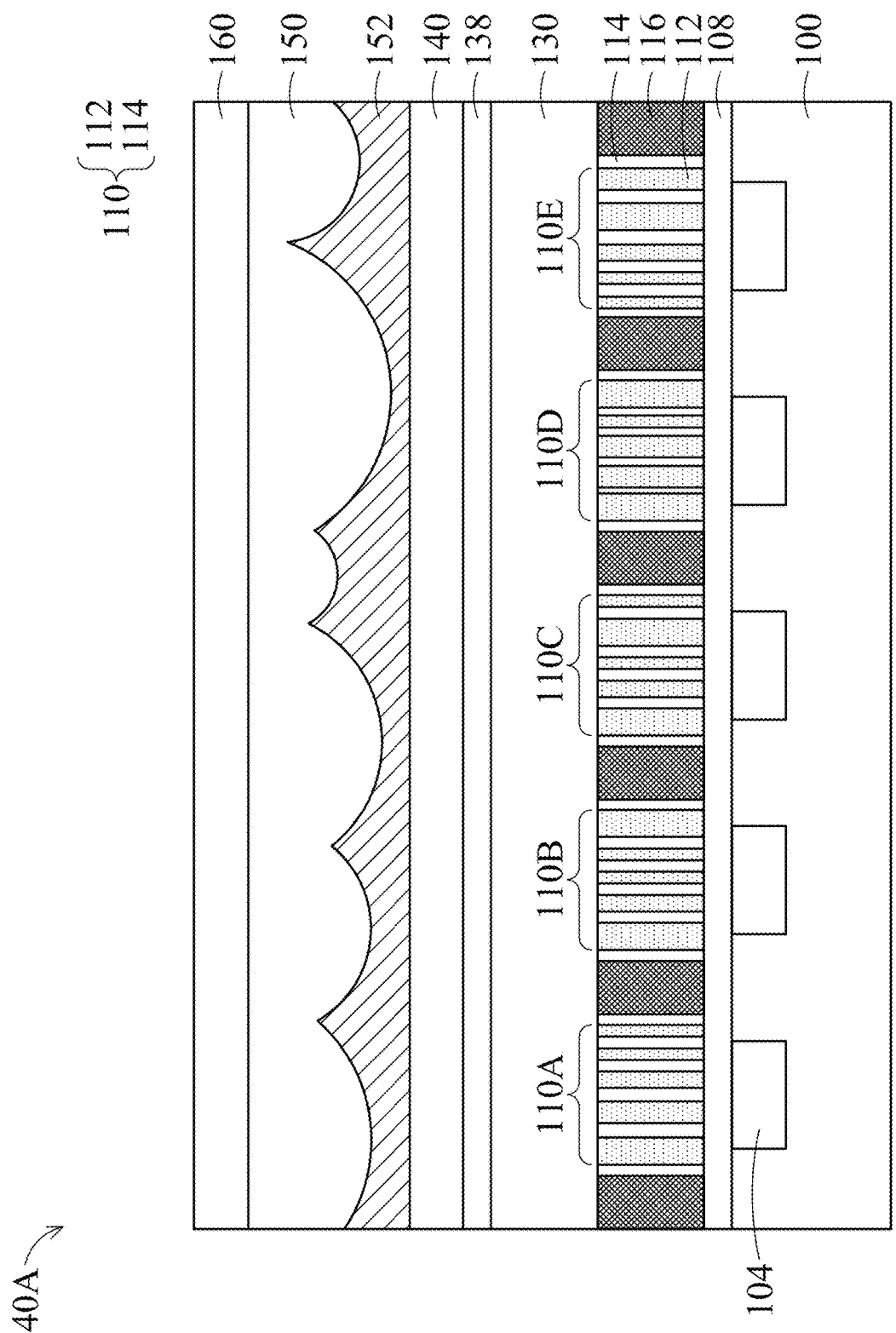
FIGS. 4A-4C are cross-sectional views of ambient light sensors with various designs, according to other embodiments of the present disclosure.
Figure 4B:
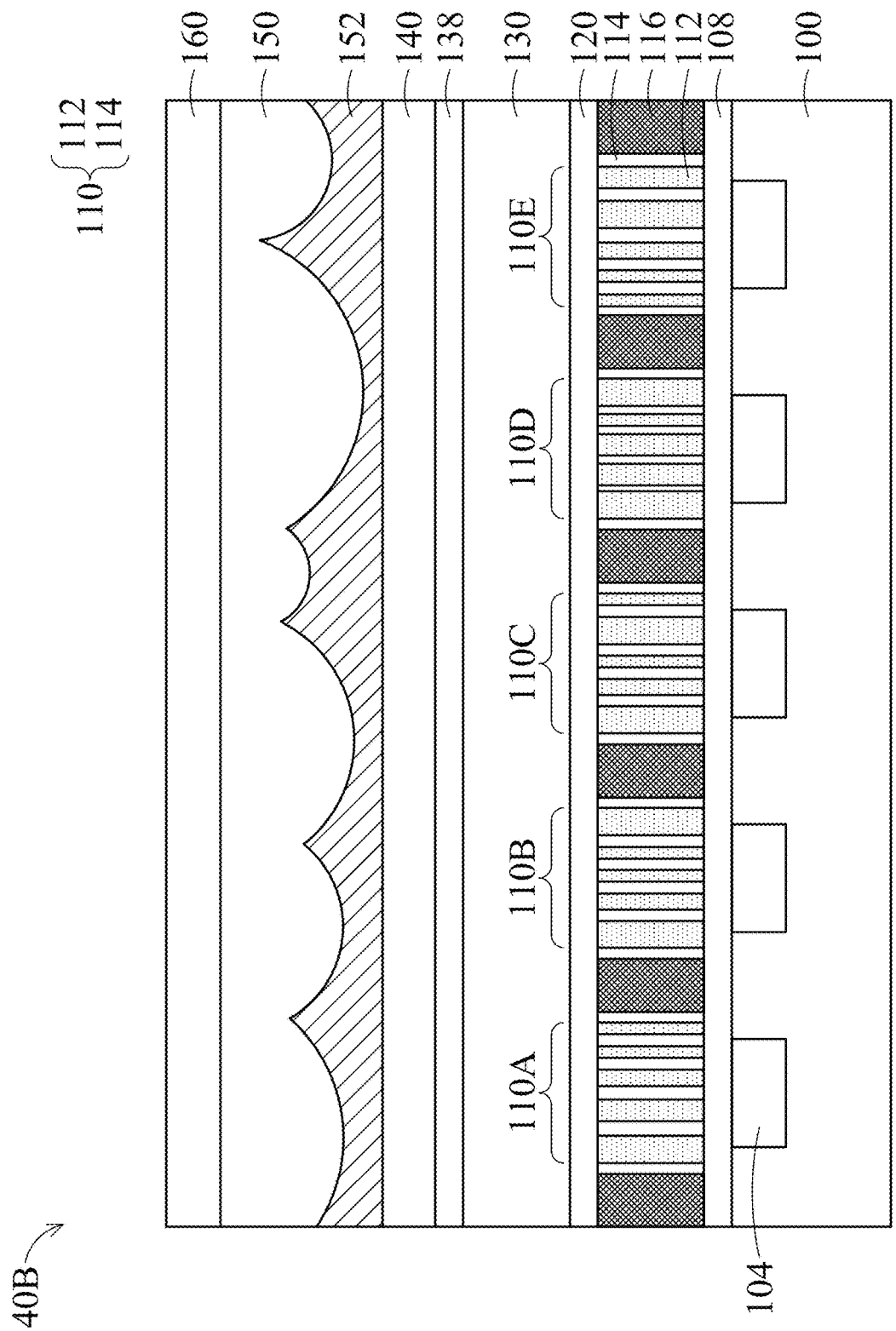
Figure 4C:
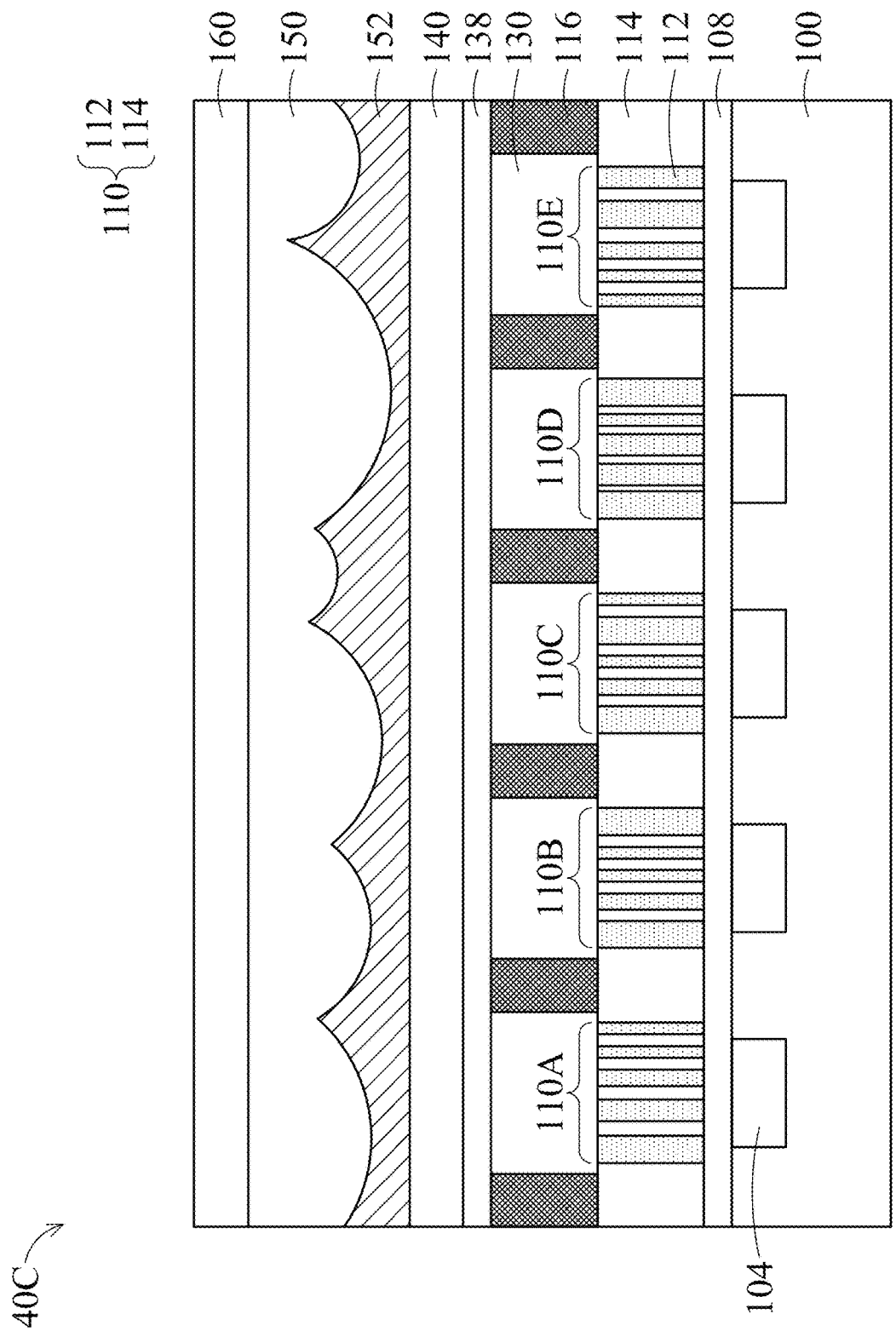

FIGS. 4A-4C are cross-sectional views of ambient light sensors 40A, 40B, and 40C with various designs, according to other embodiments of the present disclosure. In some embodiments, additional film layers may be disposed below and above the metasurface 110, depending on the application or the design requirements. The features of the substrate 100, the plurality of sensing portions 104, the metasurface 110, the aperture layer 116, and the spacer layer 120 are similar to those illustrated in FIGS. 1A-1C, and the details are not described again herein to avoid repetition. Moreover, the features of the glue layer 130, the lower glass layer 140, the glue layer 150, the lens layer 152, and the upper glass layer 160 are similar to those illustrated in FIGS. 3A-3C, and the details are not described again herein to avoid repetition.

Referring to FIG. 4A, the cross-sectional view of the ambient light sensor 40A is illustrated. In comparison with FIG. 3A, a first transparent conducting film 108 may be disposed between the substrate 100 and the metasurface 110, and a second transparent conducting film 138 may be disposed between the glue layer 130 and the lower glass layer 140. The feature of the first transparent conducting film 108 shown in FIG. 4A is similar to that shown in FIG. 2A, and the details are not described again herein to avoid repetition. The feature of the second transparent conducting film 138 is similar to that of the first transparent conducting film 108, and the details are not described again herein to avoid repetition. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

Referring to FIG. 4B, the cross-sectional view of the ambient light sensor 40B is illustrated. In comparison with FIG. 3B, the first transparent conducting film 108 may be disposed between the substrate 100 and the metasurface 110, and the second transparent conducting film 138 may be disposed between the glue layer 130 and the lower glass layer 140. The features of the first transparent conducting film 108 and the second transparent conducting film 138 are similar to those illustrated in FIG. 4A, and the details are not described again herein to avoid repetition. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

Referring to FIG. 4C, the cross-sectional view of the ambient light sensor 40C is illustrated. In comparison with FIG. 3C, the first transparent conducting film 108 may be disposed between the substrate 100 and the metasurface 110, and the second transparent conducting film 138 may be disposed between the glue layer 130 and the lower glass layer 140. The features of the first transparent conducting film 108 and the second transparent conducting film 138 are similar to those illustrated in FIG. 4A, and the details are not described again herein to avoid repetition. According to some embodiments of the present disclosure, the different wavelengths (or colors) of the ambient light may be separated by the metasurface 110, so each of the sub-meta group 110A, the sub-meta group 110B, the sub-meta group 110C, the sub-meta group 110D, and the sub-meta group 110E may allow only the desired color to transmit. Moreover, the metasurface 110 can be patterned over a single process cycle, thereby reducing the occurrence of cosmetic defects. In other words, the metasurface 110 can be fabricated quicker and cheaper.

The present disclosure replaces the conventional multiple bandpass filters in the ambient light sensor with the metasurface. The different wavelengths (or colors) of the ambient light may be separated by the metasurface, so each of the sub-meta groups may allow only the desired color to transmit, while the unwanted colors may be absorbed or reflected away by the sub-meta group. In other words, the metasurface can demonstrate the same bandpass filter function. Unlike the conventional multiple bandpass filters that need to be patterned separately and often induce poor coating, stripping, or other cosmetic defects, the metasurface of the present disclosure can be patterned over a single process cycle, thereby eliminating any cosmetic defects and the potential misalignment. As a result, the metasurface 110 can be fabricated quicker and cheaper.

The foregoing outlines features of several embodiments so that those skilled in the art will better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the prior art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. An ambient light sensor, comprising:
   a substrate;
   a plurality of sensing portions embedded in the substrate and configured to sense ambient light and to generate an intensity signal;
   a metasurface disposed on the substrate, comprising:
      a plurality of nanostructures; and
      a filling layer laterally surrounding the plurality of nanostructures; and
   an aperture layer disposed on the substrate, wherein the aperture layer laterally separates the metasurface into a plurality of sub-meta groups, wherein the plurality of sub-meta groups correspond respectively to the sensing portions.

2. The ambient light sensor of claim 1, wherein the aperture layer comprises a black photoresist, a dielectric material, or metals.

3. The ambient light sensor of claim 1, wherein the aperture layer is disposed horizontally between the plurality of sub-meta groups.

4. The ambient light sensor of claim 1, wherein the aperture layer is disposed above the metasurface.

5. The ambient light sensor of claim 1, wherein the plurality of sub-meta groups are disposed correspondingly to the plurality of sensing portions, respectively.

6. The ambient light sensor of claim 1, wherein each of the plurality of nanostructures has a circular shape, a rectangular shape, or a hexagonal shape from top view.

7. The ambient light sensor of claim 1, wherein a refractive index of the plurality of nanostructures is less than 1.4.

8. The ambient light sensor of claim 7, wherein a refractive index of the filling layer is less than the refractive index of the plurality of nanostructures.

9. The ambient light sensor of claim 8, wherein the filling layer is air.

10. The ambient light sensor of claim 1, wherein a thickness of the filling layer equals a thickness of the plurality of nanostructures.

11. The ambient light sensor of claim 1, wherein a thickness of the filling layer is higher than a thickness of the plurality of nanostructures.

12. The ambient light sensor of claim 1, wherein a first transparent conducting film (TCF) is disposed between the substrate and the metasurface.

13. The ambient light sensor of claim 12, wherein the first transparent conducting film is a transparent conducting oxide (TCO), the transparent conducting oxide comprises indium tin oxide (ITO), fluorine-doped tin oxide (FTO), zinc oxide (ZnO), or aluminum-doped zinc oxide (AZO).

14. The ambient light sensor of claim 1, further comprising a diffuser structure disposed on the metasurface and the aperture layer.

15. The ambient light sensor of claim 14, wherein a spacer layer is disposed between the metasurface and the diffuser structure.

16. The ambient light sensor of claim 14, wherein the diffuser structure comprising:
a glue layer covering the metasurface and the aperture layer; and
diffuse particles disposed within the glue layer.

17. The ambient light sensor of claim 14, wherein the diffuser structure comprising:
a first glue layer covering the metasurface and the aperture layer;
a lens layer disposed on the first glue layer, wherein the lens layer has a curved surface; and
a second glue layer covering the lens layer.

18. The ambient light sensor of claim 17, further comprising:
a lower glass layer disposed between the first glue layer and the lens layer; and
an upper glass layer disposed above the second glue layer.

19. The ambient light sensor of claim 18, wherein a second transparent conducting film is disposed between the first glue layer and the lower glass layer.

* * * * *